(12) United States Patent
Ptochos et al.

(10) Patent No.: US 12,006,960 B2
(45) Date of Patent: Jun. 11, 2024

(54) FASTENING SYSTEM FOR METALLIC CELLULAR FLOORING OF A SHIPPING CONTAINER

(71) Applicant: PEOPLE Technology Solutions, LTD., London (GB)

(72) Inventors: Dimitrios P. Ptochos, Messini (GR);
Sotirios P. Ptochos, Messini (GR);
Evangelos P. Ptochos, Messini (GR);
Milan M. Sunaric, Nafpaktos (GR)

(73) Assignee: PEOPLE TECHNOLOGY SOLUTIONS, LTD., London (GB)

( * ) Notice: Subject to any disclaimer, the term of this patent is extended or adjusted under 35 U.S.C. 154(b) by 153 days.

(21) Appl. No.: 17/338,614

(22) Filed: Jun. 3, 2021

(65) Prior Publication Data
US 2021/0381540 A1 Dec. 9, 2021

(51) Int. Cl.
*F16B 25/00* (2006.01)
*B65D 90/08* (2006.01)
*F16B 25/10* (2006.01)

(52) U.S. Cl.
CPC ............ *F16B 25/103* (2013.01); *B65D 90/08* (2013.01)

(58) Field of Classification Search
None
See application file for complete search history.

(56) References Cited

U.S. PATENT DOCUMENTS

| 3,738,218 | A | | 6/1973 | Gutshall |
| 5,329,738 | A | * | 7/1994 | Ovaert ............... E04D 3/3603 411/533 |
| 10,822,163 | B2 | | 11/2020 | Ptochos et al. |

FOREIGN PATENT DOCUMENTS

| CN | 204288399 | 4/2015 | |
| GB | 973559 | 10/1964 | |
| WO | WO-2013041068 A1 * | 3/2013 | ........... B65D 88/121 |

OTHER PUBLICATIONS

Machine translation of WO 2013/041068 (Year: 2023).*

* cited by examiner

*Primary Examiner* — Alexander S Thomas
(74) *Attorney, Agent, or Firm* — CRGO Global; Steven M. Greenberg

(57) ABSTRACT

A fastening system for a metallic cellular shipping container floor includes a potted insert with a body disposed between a top flange at one end and a bottom flange at another end. The body defines a channel from the top flange leading towards the bottom flange and has a depth not exceeding a distance from the top flange to the bottom flange. The system also includes a hole formed in a panel of a metallic cellular shipping container floor with a depth identical to or greater than a distance from a top portion of the top flange to a bottom portion of the bottom flange. Finally, the system includes a self-tapping screw disposed within the channel of the potted insert, and including a threaded shaft with tip at a distal end of the shaft, and a screw head at a proximal end of the shaft.

6 Claims, 3 Drawing Sheets

FASTENING SYSTEM FOR METALLIC CELLULAR FLOORING OF A SHIPPING CONTAINER

BACKGROUND OF THE INVENTION

Field of the Invention

The present invention relates to the field of shipping container flooring and more particularly to the fastening of shipping container flooring.

Description of the Related Art

Since first introduced nearly seven decades ago, standardized shipping containers have revolutionized cargo transport. A shipping container is a reusable transport and storage unit that serves to move products and materials between multiple locations. A typical container consists of a rectangular, closed box design with doors on one end, a corrugated weathering steel frame, and a wooden floor. Although approximately ninety percent of the world's shipping containers are either twenty feet or forty feet in length, the lengths of containers around the world vary from eight to sixty feet. Regardless of length, standard containers are eight feet wide by eight and one-half feet high, while "hi-cube" units measure nine and one-half feet high, and "half-height" units measure four and one quarter feet high. The capacity of a shipping container is commonly expressed in twenty-foot equivalent units (TEU), which represents the amount of cargo that can fit in one twenty foot container. Costs for transport are calculated in TEU. Two TEU is equivalent to one forty-foot equivalent unit (FFE).

A shipping container consists of some key structural components that all transfer weight and racking forces. The first component is the roof. A shipping container roof is typically made of weathering steel sheets with corrugated profiles for strength and rigidity. The next component, the side wall panels, are made from the same material as the roof. Another component of a shipping container is the floor and cross members. A container floor is typically made of laminated marine plywood. The cross members are a series of transverse beams that provide for an integral part of the floor frame support. The floor frame may optionally include the gooseneck tunnel, which facilitates for the container's truck transport. The container floor rests on the cross members. An additional component is the top and bottom side rails. The side rails are longitudinal structure members located on the top and bottom of the container that act as a frame for the container's body. Other important components include the corner post and corner castings, the top and bottom beams of the front end and the door end assemblies and the doors.

The construction of a shipping container also is a standardized process which begins with the unrolling of a large roll of steel and the cutting of the roll of steel into several sheets of appropriate size. The sheets are then corrugated to provide rigidity and extra strength. Next, the sheets are welded together into wall panels. Square tubing top side rails are then welded on the top of each wall to create side wall assembly. Thereafter, floor cross-members, gooseneck tunnel and bottom side rails are welded together to create the frame of the floor. Doors, door end posts, door end beams and door end corner castings are welded together to create the door end assembly. Similarly, front end walls, front end corner posts, front end beams and front-end corner castings are welded together to create the front-end assembly. Once these components are assembled, the door end assembly and the front-end assembly are installed on the floor frame before the sidewall assemblies are installed. At this point sidewall assemblies are welded to the corner posts, door end assembly and front-end assembly and the bottom side rails of the floor frame. Next, the roof panel is assembled and welded. In this phase an anti-corrosion primer is applied all over the container structure. Finally, wooden plates are prepared for flooring. Each wooden plate is secured to the cross-beam members utilizing self-tapping screws.

Recent trends in shipping container construction, however, suggest the use of a material other than wood for the flooring of a shipping container. Design concerns causing this shift in material include the need for a more lightweight container while enhancing the strength of the flooring. Addressing the foregoing design concerns, it has been proposed to utilize metallic flooring. The proposed metallic flooring includes a cellular construction, in which a sea of adjacent polygonal cells provide strength to the flooring while minimizing the amount of material present in the flooring resulting in a lightweight structure. As it will be recognized, though, such flooring cannot be easily secured to the cross-beam members of the shipping container as a self-tapping screw cannot "self-tap" the primarily hollow interior of the cellular metallic flooring.

BRIEF SUMMARY OF THE INVENTION

Embodiments of the present invention address deficiencies of the art in respect to flooring assembly in a shipping container and provide a novel and non-obvious fastening system for a metallic cellular shipping container floor. In an embodiment of the invention, a fastening system for a metallic cellular shipping container floor includes a potted insert that includes a body disposed between a top flange at one end of the body and a bottom flange at another end of the body. The body defines a channel from the top flange leading towards the bottom flange and has a depth that does not exceed a distance from the top flange to the bottom flange. The system also includes a hole formed in a panel of a metallic cellular shipping container floor with a depth that is identical to or greater than a distance from a top portion of the top flange of the potted insert to a bottom portion of the bottom flange of the potted insert. Finally, the system includes a self-tapping screw disposed within the channel of the potted insert, and including a threaded shaft with tip at a distal end of the shaft, and a screw head at a proximal end of the shaft. In this regard, the tip of the screw and at least a portion of the threaded shaft may be embedded in a cross-beam member abutting a surface of the panel.

In one aspect of the embodiment, the threaded shaft is fluted creating a cutting edge on the threaded shaft. In another aspect of the embodiment, an interior surface of the channel has a measured perimeter that is greatest at longitudinal position within the channel that is intermediate to the top flange and the bottom flange. In yet another aspect of the embodiment, the measured perimeter of the channel is greatest at the top flange or at the bottom flange. In even yet another aspect of the embodiment, an interior surface of the channel has a funnel shape with a circumference that decreases non-linearly towards the depth of the channel and then becomes constant from an intermediate position in the channel until a position at the depth of the channel. Finally, in even yet another aspect of the embodiment, the system includes a synthetic material, such as an epoxy resin, filling a void between the body of the potted insert and an interior wall of the hole in the panel when the potted insert is inserted into the hole.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a fastening system for a metallic cellular shipping container floor. In accordance with an embodiment of the invention, a hole is formed in a metallic cellular shipping container floor and a potted insert inserted therein with resin applied within the voided spaces between an outside surface of the insert and an inside surface of the floor. The potted insert is flanged at opposite ends and has a body that defines a channel from one flange, longitudinally towards an opposite one of the flanges and has a depth that does not exceed a distance from the top flange to the bottom flange. An interior surface of the channel optionally has a perimeter which when measured, decreases from the one flange, longitudinally, towards the opposite one of the flanges. A self-tapping screw with threaded shaft, optionally fluted, is disposed within the channel with a tip of the screw penetrating a top surface of a cross beam member upon which the floor rests thereby securing the floor to the cross-beam member.

Figure 1:
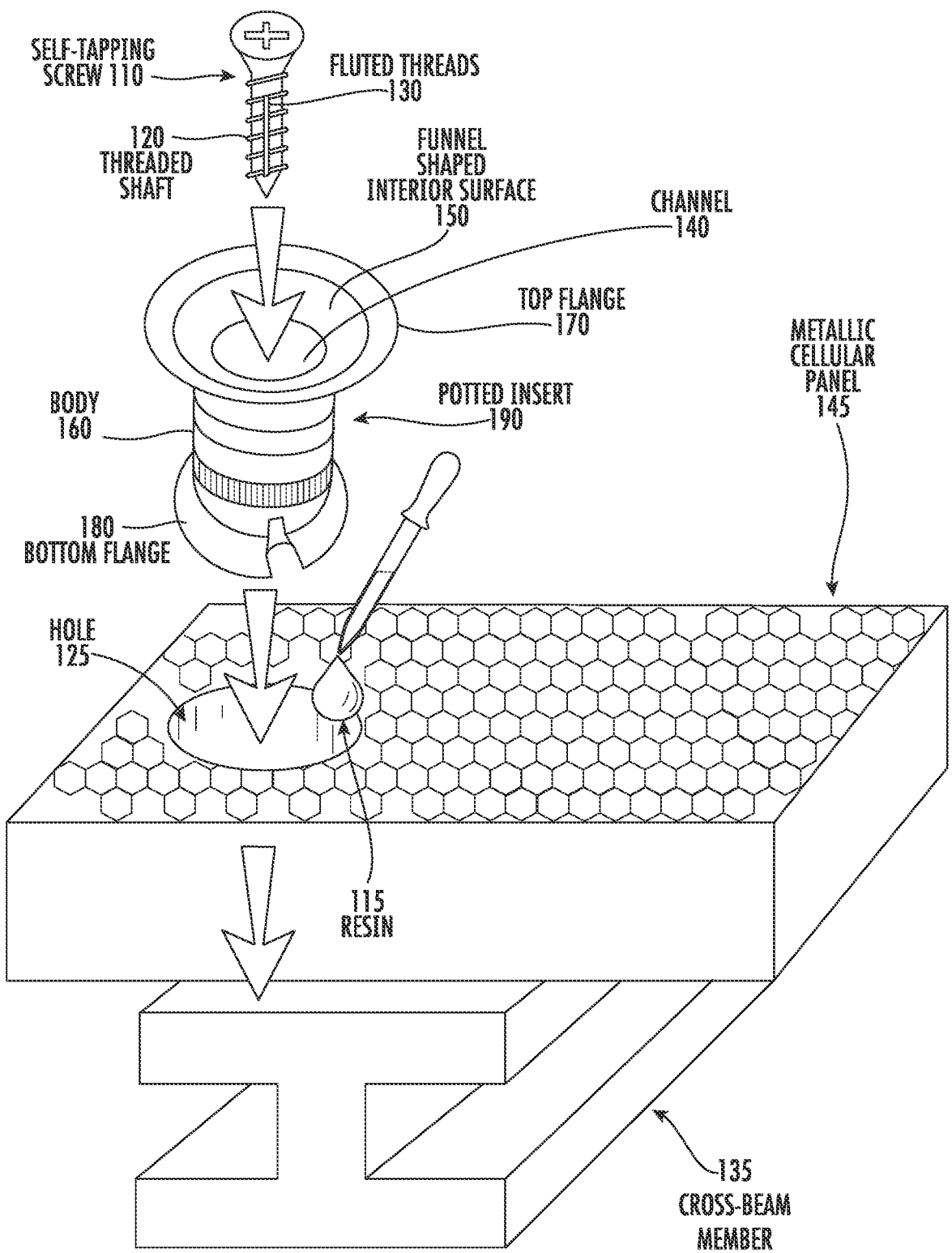
FIG. 1 is a perspective view of a fastening system for a metallic cellular shipping container floor.

In further illustration, FIG. 1 is a perspective view of a fastening system for a metallic cellular shipping container floor. As shown in FIG. 1, multiple different holes 125 (only a single one of the holes 125 shown for the purpose of illustrative simplicity) are formed in a metallic cellular panel 145, each in correspondence to a top surface of a cross-beam member 135 (only a partial view of a single cross-beam member shown for the purpose of illustrative simplicity), with a depth that is identical to or greater than a distance from a top portion of the top flange of the potted insert to a bottom portion of the bottom flange of the potted insert. The metallic cellular panel 145 is a panel with a top surface and a bottom surface and a cellular core defined by a multiplicity of polygonal cells so as to provide strength to the panel while minimizing a mass of the panel.

A potted insert 190 is inserted into each one of the holes 125 so that a top flange 170 of the potted insert 190 is flush with a top surface of the metallic cellular panel 145. In an example shown, the corresponding one of the holes 125 is drilled through the thickness of the metallic cellular panel 145 and the length of the potted insert 190 is co-extensive with a depth of a corresponding one of the holes 125 of the metallic cellular panel 145, so that a bottom flange 180 of the potted insert 190 is flush with a bottom surface of the metallic cellular panel 145; however, the corresponding one of the holes 125 may have depth that is less than the thickness of the panel 145 and bottom flange 180 of the potted insert 190 may be disposed at any depth of the corresponding one of the holes 125. Optionally, to secure the potted insert 190 within the corresponding one of the holes 125, a synthetic resin 115, for example an epoxy resin, is inserted into the voided areas between an outside surface of the potted insert 190 and an interior surface of the corresponding one of the holes 125.

The potted insert 190 itself includes a body 160 between the top flange 170 and the bottom flange 180 and defines an interior channel 140 through which a self-tapping screw 110 is inserted. The channel 140 includes an interior surface 150, which in one aspect of the embodiment, may have the shape of a funnel with a circumference that non-linearly decreases from a portion nearest the top flange 170 to a portion intermediate to the top flange 170 and the bottom flange 180. The self-tapping screw 110, in turn, has a threaded shaft 120 with optionally fluted threads 130. In this way, when inserted through the channel 140, the self-tapping screw 110 secures itself into a top portion of the cross-beam member 135 with a head of the self-tapping screw 110 contacting the interior surface 150 so as to pull the potted insert 190 and the metallic cellular panel 145 along with it towards the top surface of the cross-beam member 135.

Figure 2:
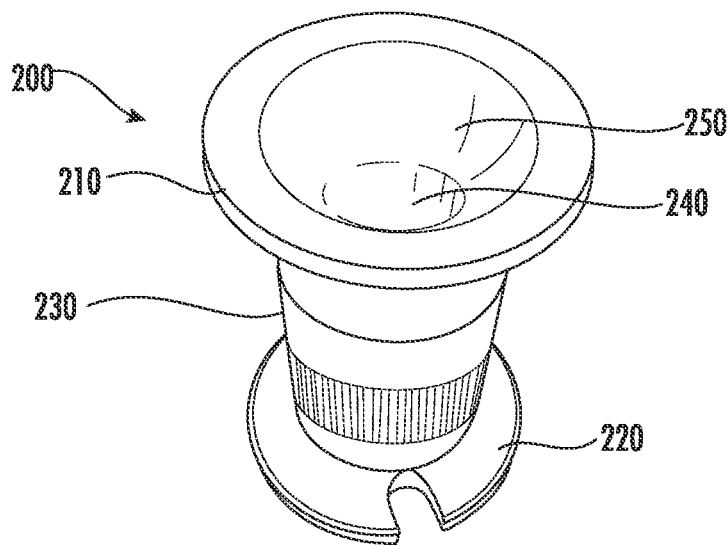
FIG. 2 is a perspective view of the potted insert of FIG. 1.

In further illustration, FIG. 2 is a perspective view of the potted insert of FIG. 1. As shown in FIG. 2, an exemplary potted insert 200 has a body 230 positioned between a top flange 210 and a bottom flange 220. The body 230 defines a channel 240 that includes an interior surface 250. Optionally, the interior surface 250 is funnel shaped with a circumference that non-linearly decreases from a portion of the channel 240 nearest the top flange 210 to a portion of the channel intermediate to or immediately adjacent to the bottom flange 220.

Figure 3:
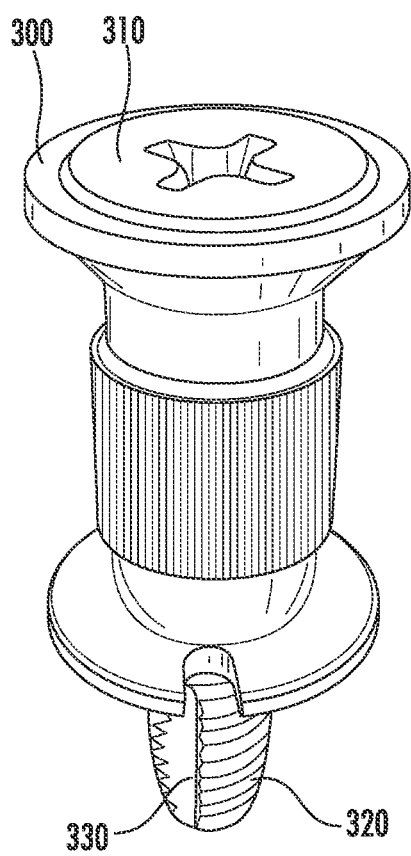
FIG. 3 is a side view of the potted insert of FIG. 2 with a self-tapping screw with fluted threaded shaft inserted therethrough.
Figure 4:
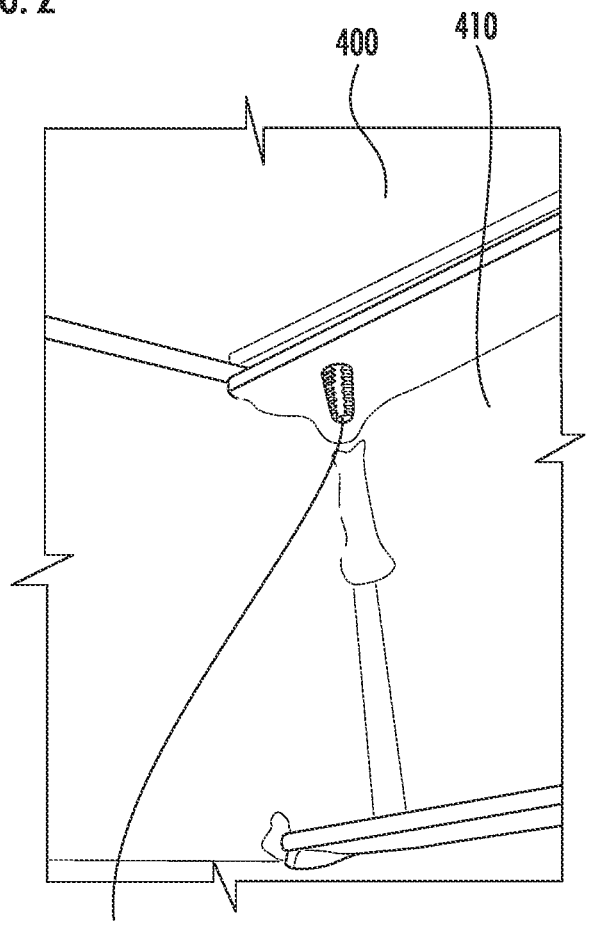
FIG. 4 is a bottom perspective view of a bottom surface of a metallic cellular shipping container floor secured to a cross-beam member with the self-tapping screw of the fastening system of FIG. 1; and, FIG. 5 is a side cut-away view of a panel of a metallic cellular shipping container floor secured to a cross beam member of a shipping container utilizing the fastening system of FIG. 1.

In reference to FIG. 3 which is a side view of the potted insert of FIG. 2 with a self-tapping screw with fluted threaded shaft inserted therethrough, the self-tapping screw 310 may be inserted into the potted insert 300 so that a tip of the threaded shaft 320 with optional fluting 330 can threadedly secure itself to a top surface of a cross beam member with the interior surface of the potted insert (not shown) frictionally engaging a screw head of the threaded screw 310. As shown in FIG. 4 which is an example of a bottom perspective view of a bottom surface of a metallic cellular shipping container floor secured to a cross-beam member with the self-tapping screw of the fastening system of FIG. 1, the tip 420 of the screw may pass through an outer portion of the cross-beam member 410 so as to secure the metallic cellular panel 400 to the cross-beam member 410.

Figure 5:
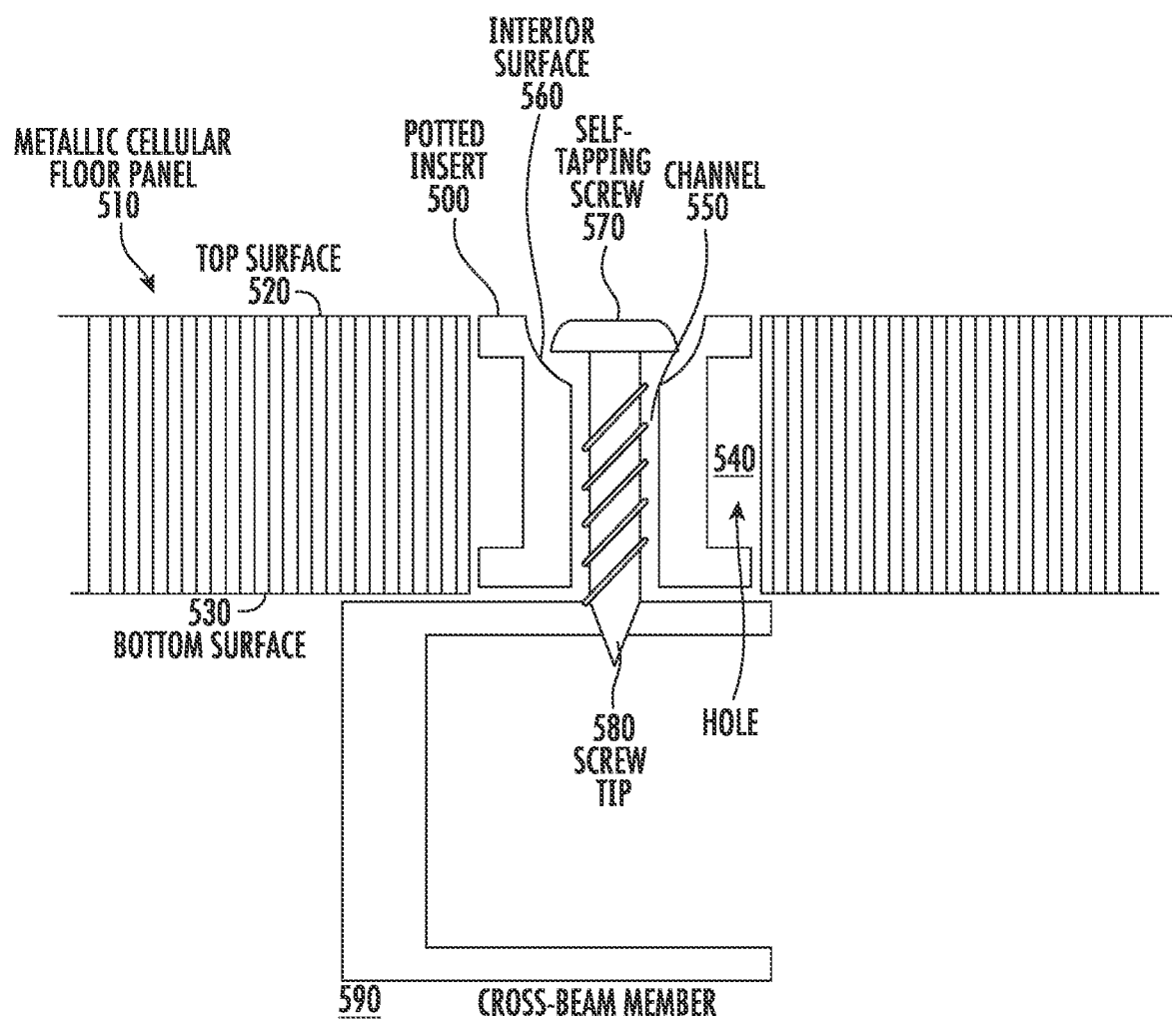

In even yet further illustration, FIG. 5 is an exemplary side cut-away view of a panel of a metallic cellular shipping container floor secured to a cross beam member of a shipping container utilizing the fastening system of FIG. 1. As shown in FIG. 5, through the operation of the fastening system of FIG. 1, a metallic cellular floor panel 510 may be secured to a cross-beam member 590 of a shipping container. More particularly, a potted insert 500 may be inserted into a hole 540 drilled into the panel 510 with a top flange of the potted insert 500 being flush with a top surface 520 of the panel 510 and optionally, a bottom flange of the potted insert 500 being flush with a bottom surface 530 of the panel 510.

The potted insert 500 includes a channel 550 with a funnel shaped interior surface 560. A self-tapping screw 570 is inserted into the channel 550 with the tip 580 of the self-tapping screw 570 embedding itself into a top surface of the cross-beam member 590, either centrally to the cross-beam member, or through a flange extending laterally from a vertical web of the cross-beam member. The screw tip 580 of the self-tapping screw 570 may proceed through the cross-beam member to a depth limited by a frictional contacting of a bottom portion of a screw head of the self-tapping screw 570 and the interior surface 560 so as to secure the panel 510 to the cross-beam member 590.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials and equivalents of all means plus function elements in the claims below are intended to include any structure or material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A fastening system for a metallic cellular shipping container floor, comprising:
   a potted insert comprising a body disposed between a top flange at one end of the body and a bottom flange at another end of the body, the body defining a channel from the top flange leading towards the bottom flange and having a depth that does not exceed a distance from the top flange to the bottom flange, wherein an interior surface of the channel has a measured perimeter that is greatest at the top flange of the potted insert and is parabolic in progression from the measured perimeter from the top flange to the bottom flange;
   a hole formed in a panel of a metallic cellular shipping container floor with a depth that is identical to or greater than a distance from a top portion of the top flange of the potted insert to a bottom portion of the bottom flange of the potted insert; and,
   a self-tapping screw disposed within the channel of the potted insert, the screw comprising a threaded shaft with tip at a distal end of the shaft, and a screw head at a proximal end of the shaft;
   wherein the tip of the self-tapping screw and at least a portion of the threaded shaft are embedded in a cross-beam member abutting a surface of the panel; and,
   wherein the self-tapping screw secures itself into a top portion of the cross-beam member with a head of the self-tapping screw contacting the surface so as to pull the potted insert and the metallic cellular shipping container floor along with it towards the surface of the cross-beam member.

2. The fastening system of claim 1, wherein the threaded shaft is fluted creating a cutting edge on the threaded shaft.

3. The fastening system of claim 1, wherein an interior surface of the channel has a funnel shape.

4. The fastening system of claim 1, further comprising a synthetic resin filling a void between the body of the potted insert and an interior wall of the hole in the panel when the potted insert is inserted into the hole.

5. A fastening system for a metallic cellular shipping container floor, comprising:
   a potted insert comprising a body disposed between a top flange at one end of the body and a bottom flange at another end of the body, the body defining a channel from the top flange leading towards the bottom flange and having a depth that does not exceed a distance from the top flange to the bottom flange, the channel comprising an interior surface with a funnel shape having a circumference that decreases towards the depth of the channel and then becomes constant from an intermediate position in the channel until a position at the depth of the channel, wherein the interior surface of the channel has a measured perimeter that is greatest at the top flange of the potted insert and is parabolic in progression from the measured perimeter from the top flange to the bottom flange;
   a hole formed in a panel of a metallic cellular shipping container floor with a depth that is identical to or greater than a distance from a top portion of the top flange of the potted insert to a bottom portion of the bottom flange of the potted insert; and,
   a self-tapping screw disposed within the channel of the potted insert, the screw comprising a fluted, threaded shaft with a cutting edge and a tip at a distal end of the shaft, and a screw head at a proximal end of the shaft;
   wherein the tip of the screw and at least a portion of the threaded shaft are embedded in a cross-beam member abutting a surface of the panel; and,
   wherein the self-tapping screw secures itself into a top portion of the cross-beam member with a head of the self-tapping screw contacting the surface so as to pull the potted insert and the metallic cellular shipping container floor along with it towards the surface of the cross-beam member.

6. A fastening system for a metallic cellular shipping container floor, comprising:
- a potted insert comprising a body disposed between a top flange at one end of the body and a bottom flange at another end of the body, the body defining a channel from the top flange leading towards the bottom flange and having a depth that does not exceed a distance from the top flange to the bottom flange, the channel comprising an interior surface with a measured perimeter that is greatest at the top flange of the potted insert, wherein the interior surface of the channel is parabolic in progression from the measured perimeter from the top flange to the bottom flange;
- a hole formed in a panel of a metallic cellular shipping container floor with a depth that is identical to or greater than a distance from a top portion of the top flange of the potted insert to a bottom portion of the bottom flange of the potted insert; and,
- a self-tapping screw disposed within the channel of the potted insert, the screw comprising a fluted, threaded shaft with a cutting edge and a tip at a distal end of the shaft, and a screw head at a proximal end of the shaft;
- wherein the tip of the screw and at least a portion of the threaded shaft are embedded in a cross-beam member abutting a surface of the panel; and,
- wherein the self-tapping screw secures itself into a top portion of the cross-beam member with a head of the self-tapping screw contacting the surface so as to pull the potted insert and the metallic cellular shipping container floor along with it towards the surface of the cross-beam member.

\* \* \* \* \*